ROBERT O. LOWREY, OF SALEM, NEW YORK.

Letters Patent No. 89,053, dated April 20, 1869; antedated March 23, 1869.

IMPROVED MODE OF RENDERING BRICK, STONE, CLAY, PLASTER, &c., WATER REPELLENT.

The Schedule referred to in these Letters Patent and making part of the same.

*To all whom it may concern:*

Be it known that I, ROBERT O. LOWREY, of Salem, in the county of Washington, and State of New York, have invented certain new and useful Improvements in Rendering Brick, Artificial Stone, Mortar, Plaster, Cement, &c., Water Repellent; and I do hereby declare that the following is a full, clear, and exact description thereof.

To enable others skilled in the art to construct and use my invention, I will proceed to describe it.

My invention relates to water-proofing, and consists in making brick, artificial stone, concrete, or mastic for buildings, mortar, plaster, cements, &c., water repellent.

Most of these articles, as now made, absorb water, and consequently, when exposed to its action, become more or less dampened by it.

The object of my invention is to give to these different articles, as well as to all of a similar nature, a water repellent quality, both to prevent their absorbing water, as well as to protect them measurably from its action. This I do by incorporating with the material of which they are composed and usually during the process of their manufacture, a water repellent lime and grease compound.

This compound I make by taking any quantity of lime desired, slaking it with water, and while the process of slaking is going on, and the lime still warm and in a mastic state, by adding from one to three ounces of grease, oil, or fatty substance of any kind, containing fatty acids, and thoroughly mixing them.

The quantity of grease used may be varied so as to secure a compound of greater or less repellent power, as may be desired, for different purposes.

In making unburned brick, artificial stone, concrete mastic for buildings, mortar, plaster, &c., I mix the lime and grease compound with the sand, gravel, grout, stones, clay, or other materials used for these different purposes, in any desired proportions, suitable for the purpose of imparting to the mixture, and consequently to the article or substance made from it, a water repellent quality.

In preparing mortar for laying up brick or stone walls, or for plastering, and in preparing hydraulic and other cements for water-pipes, tanks, street-work, ornamental work, and for all similar work, I incorporate my lime and grease compound with the other materials, used in any convenient way, and in such quantity as will give a water repellent quality to the mortar or cement when dry.

Having thus described my invention,

What I claim, is—

The method of rendering brick, artificial stone, mortar, plaster, cement, concrete, and similar articles, water repellent, by the addition or use of a lime and grease compound, substantially as herein described.

ROBT. O. LOWREY.

Witnesses:
J. McKENNEY,
P. T. DODGE.